US012342128B1

(12) United States Patent
Gros et al.

(10) Patent No.: US 12,342,128 B1
(45) Date of Patent: Jun. 24, 2025

(54) UNDERWATER SOUND SYSTEM FOR WATERCRAFT

(71) Applicant: Highway Products, Inc., White City, OR (US)

(72) Inventors: Charles P. Gros, Eagle Point, OR (US); Jason Daniel Stoutenburgh, Eagle Point, OR (US)

(73) Assignee: HIGHWAY PRODUCTS, INC.

( * ) Notice: Subject to any disclaimer, the term of this patent is extended or adjusted under 35 U.S.C. 154(b) by 213 days.

(21) Appl. No.: 18/085,471

(22) Filed: Dec. 20, 2022

Related U.S. Application Data

(60) Provisional application No. 63/421,527, filed on Nov. 1, 2022.

(51) Int. Cl.
*H04R 1/44* (2006.01)

(52) U.S. Cl.
CPC ........... *H04R 1/44* (2013.01); *H04R 2499/13* (2013.01)

(58) Field of Classification Search
None
See application file for complete search history.

(56) References Cited

U.S. PATENT DOCUMENTS 3,174,129 A * 3/1965 Laughlin ................ H04B 11/00 381/189
5,142,508 A * 8/1992 Mitchell .............. G08B 21/082 367/136
6,545,948 B1 * 4/2003 Jiang ........................ H04R 1/44 367/165
8,792,306 B2 * 7/2014 Palmer .................. A01K 97/02 367/153
9,315,235 B1 * 4/2016 Wood .................... B63B 39/061
9,669,903 B2 * 6/2017 Gasper .................... B63B 39/06
10,183,726 B1 * 1/2019 McNaughton .......... B63B 34/75
10,412,948 B2 * 9/2019 Burton ................. A01K 97/125
11,051,100 B1 * 6/2021 D'Ascanio ............... H04R 1/44
2005/0091739 A1 * 5/2005 Lerma .................... A61H 33/60 4/541.1

(Continued)

OTHER PUBLICATIONS

Jlaudio.com, MV600/2i 2 W2 Ch. Class D Full-Range Marine Amplifier with Integrated DSP, 600 W (Year: 2020).*

(Continued)

*Primary Examiner* — Isam A Alsomiri
*Assistant Examiner* — Vikas Atmakuri
(74) *Attorney, Agent, or Firm* — Jerry Haynes Law

(57) ABSTRACT

An underwater sound system for watercraft comprising multiple submersible underwater speakers that are configured to be controllably attached to outer surface of the watercraft allowing the submersible underwater speakers to submerge in water when in use or may be lifted out of water when not in use for maintenance work. The submersible underwater speakers are connected to a sound source and a power source that are controlled from the watercraft. The watercraft mounted with the underwater sound system of the present invention allows it to be used in a waterbody such as pond, lake, river, sea or the like so that some underwater activities can be conducted while the system is being used to play music or voice of the user or any recorded sound that may be useful for attracting aquatic animals, or preventing any accidents, or supporting divers or any such activities.

10 Claims, 6 Drawing Sheets

(56) References Cited

U.S. PATENT DOCUMENTS

| | | | | |
|---|---|---|---|---|
| 2006/0240722 A1* | 10/2006 | Kubinski | B63H 20/10 | |
| | | | 440/61 T | |
| 2006/0268664 A1* | 11/2006 | Lewis | A01K 79/02 | |
| | | | 367/139 | |
| 2016/0037253 A1* | 2/2016 | Workman | H04R 1/2834 | |
| | | | 381/338 | |
| 2020/0221217 A1* | 7/2020 | Kim | H04R 1/026 | |
| 2020/0275198 A1* | 8/2020 | Demer | H04R 1/025 | |

OTHER PUBLICATIONS terminalmart.com, What is a Butt Splice Connector? Why Doyou Need Them? (Year: 2021).*
Kris Wouk, Howtogeek.com, What Is a Class-D Amplifier, and What Are They Useful For? (Year: 2022).*
Quik Stage Truss Bases (Year: 2020).*
Triad-Orbit SM-IOM1 Speaker Mounting Plate (Year: 2022).*

* cited by examiner

UNDERWATER SOUND SYSTEM FOR WATERCRAFT

CROSS-REFERENCE TO RELATED APPLICATIONS

This application claims priority from U.S. Provisional Application Ser. No. 63/421,527, entitled "Underwater Sound System for Watercraft", filed on Nov. 1, 2022, which application is hereby incorporated herein by reference in its entirety.

FIELD OF THE INVENTION

The present invention relates generally to an underwater sound system. More so, the present invention relates to an underwater sound system for watercraft.

BACKGROUND OF THE INVENTION

The following background information may present examples of specific aspects of the prior art (e.g., without limitation, approaches, facts, or common wisdom) that, while expected to be helpful to provide additional aspects of the prior art, is not to be construed as limiting the present invention, or any embodiments thereof, to anything stated or implied therein or inferred thereupon.

The fact that sound waves are propagated through water has been known for many years. There are many audio devices which are water resistant, some are submersible and capable of transmitting sound underwater.

Numerous attempts have been made and several prior art devices are known for devices that are submersible and capable of transmitting sound underwater to be used in swimming pool, water bodies, speaker for divers, fish attracting submersible speakers, etc. Even though these innovations may be suitable for the specific purposes to which they address, however, they would not be as suitable for the purposes of the present invention.

For example, U.S. Pat. No. 3,174,129 to Laughlin et al. discloses an underwater sound transmitter with a microphone which is suitable for use by a diver.

U.S. Pat. No. 5,142,508 to Mitchell et al. describe aquatic alarm and sound systems for producing high-fidelity sound underwater to signal unauthorized activity in a water body.

U.S. Pat. No. 6,545,948 to Jiang teaches a submersible loudspeaker including an electro-acoustic transducer which accepts the electrical signal from the audio system and delivers sound waves generated by piezoelectric elements in proportion to the signal applied to it. The submersible loudspeaker is designed to be used in swimming pools, spas, hot tubs, bathtubs, saunas, ponds, lakes, or other bodies of water.

U.S. Pat. No. 8,792,306 to Palmer et al. discloses a submersible speaker adapted to emit a pre-recorded sound for attracting an aquatic animal to assist fishing.

U.S. patent Ser. No. 10/412,948 to Burton discloses a fishing assistive device comprising a submersible speaker with sonar transducers that is adapted to determine fish location in the underwater environment.

U.S. patent Ser. No. 11/051,100 to D'Ascanio et al. discloses a smart, under/over water speaker system comprising a unique speaker which provides sound both above and below the water surface.

It is apparent now that numerous innovations that are adapted to a variety of submersible speakers have been previously developed in the prior art that are adequate for various purposes. Furthermore, even though these innovations may be suitable for the specific purposes to which they address, accordingly, they would not be suitable for the purposes of the present invention as heretofore described to be used in a watercraft. Thus, an underwater sound system for watercrafts is needed.

SUMMARY OF THE INVENTION

The present invention relates to an underwater sound system for watercraft comprising multiple submersible underwater speakers that are configured to be controllably attached to outer surface of the watercraft allowing the submersible underwater speakers to submerge in water when in use or may be lifted out of water when not in use for maintenance work. The submersible underwater speakers are connected to a sound source and a power source that are controlled from the watercraft. The watercraft mounted with the underwater sound system of the present invention allows it to be used in a waterbody such as pond, lake, river, sea or the like so that some underwater activities can be conducted while the system is being used to play music or voice of the user or any recorded sound that may be useful for attracting aquatic animals, or preventing any accidents, or supporting divers or any such activities.

According to an aspect of the present invention, an underwater sound system for a watercraft, wherein the sound system comprises: one or more submersible underwater speakers, wherein the speakers are attached to outer body of the watercraft; a sound source; and a power source, wherein the sound player and the power source are positioned on the watercraft and are operatively connected to the speakers allowing the watercraft to play sound under the water surface.

According to another aspect of the present invention, the speakers are configured to be hinged or hooked to the to the outer body of the watercraft allowing the speakers to submerge at a desired depth in water when in use.

According to another aspect of the present invention, sound waves produced by the speakers uses piezoelectric technology to create sound under the water line of the watercraft.

According to another aspect of the present invention, the submersible underwater speakers can be tied to strings allowing to be lowered inside the water surface when the system of the present invention is used to play sound under the water surface.

It is an objective of the present invention is to provide an underwater sound system for watercraft that plays sound under the water surface in a waterbody.

It is another objective of the present invention is to provide an underwater sound system for watercraft that allows the submersible underwater speakers to be hinged or hooked to the watercraft.

It is another objective of the present invention is to provide an underwater sound system for watercraft that allows the submersible underwater speakers to be detachably attached to the watercraft.

It is another objective of the present invention is to provide an underwater sound system for watercraft that allows the submersible underwater speakers to be controlled from the watercraft.

These and other objectives, advantages and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIGS. 1A-5. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Reproducing sound in the air is quite different from reproducing sound under the water. Most speakers produce sound in air in a directional manner, whereas sound underwater is naturally omni-directional. The impedance (resistance) to sound production underwater is extremely high, as opposed to the resistance to sound production in air, which is exceptionally low.

Figure 1A:
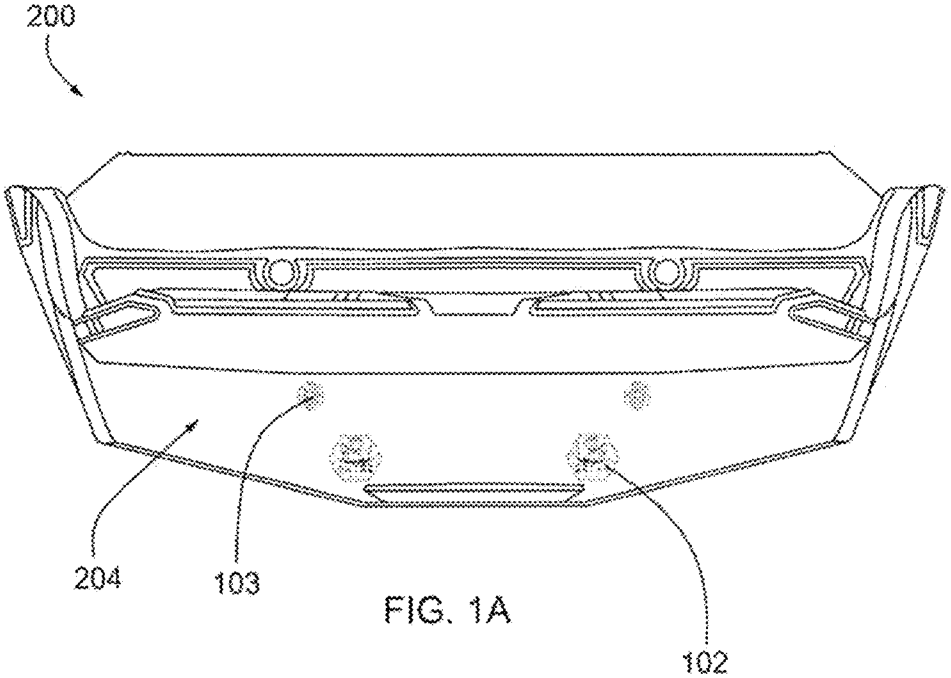
FIG. 1A illustrates an exemplary underwater sound system for watercraft comprising multiple submersible underwater speakers and underwater lights attached to the watercraft, in accordance with an embodiment of the present invention.
Figure 1B:
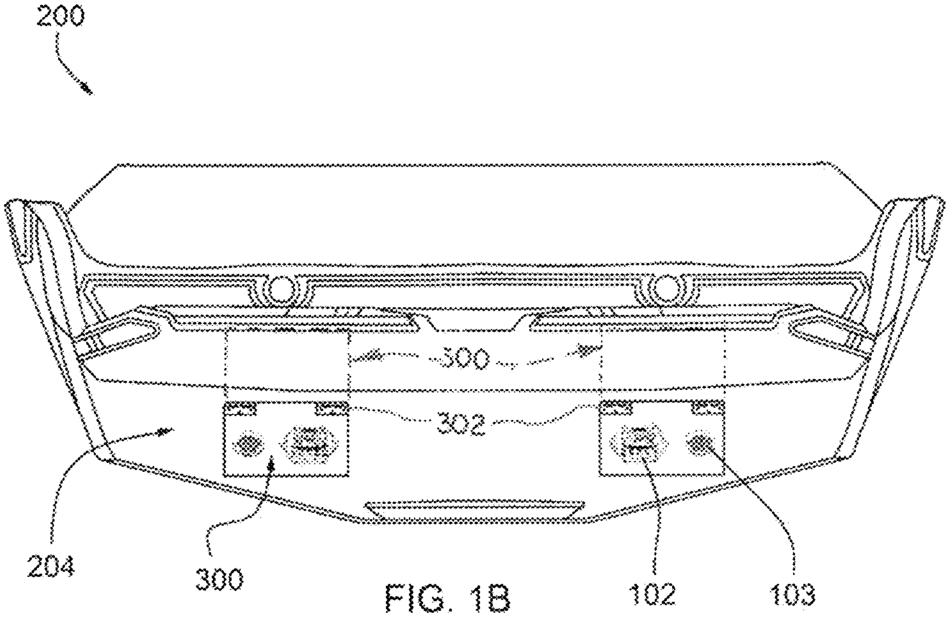
FIG. 1B illustrates an exemplary underwater sound system for watercraft comprising multiple submersible underwater speakers and underwater lights attached to a speaker plate that can be hinged or hooked to the watercraft when in use, in accordance with an embodiment of the present invention.
Figure 2:
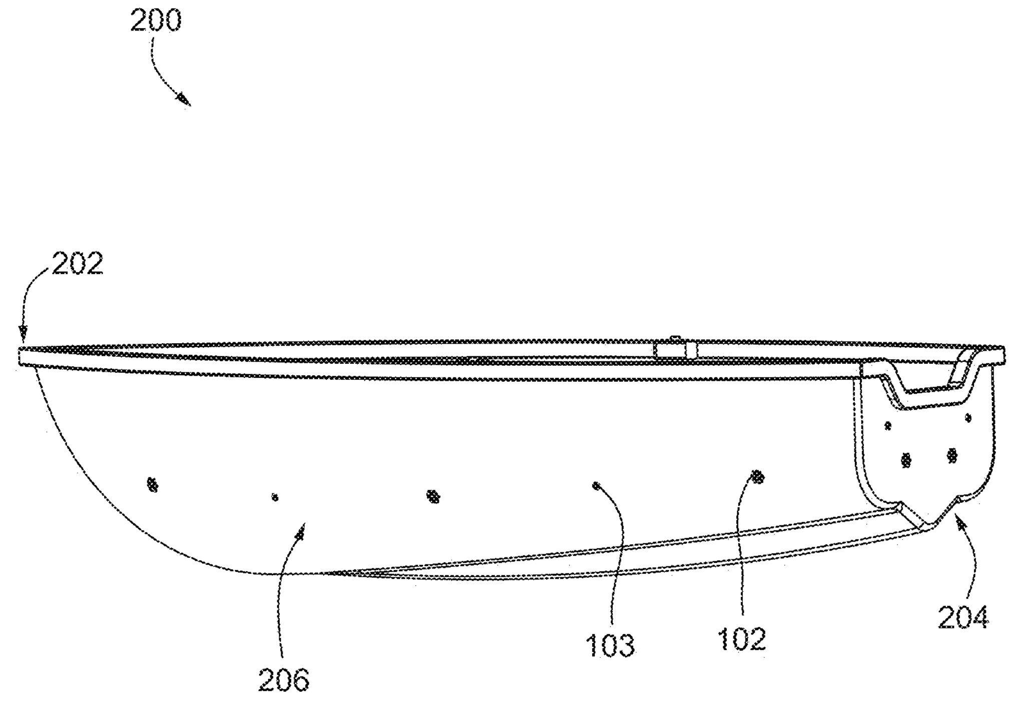
FIG. 2 illustrates an exemplary underwater sound system for watercraft comprising multiple submersible underwater speakers and underwater lights attached to hull area of the watercraft below the water surface, in accordance with an embodiment of the present invention.
Figure 6:
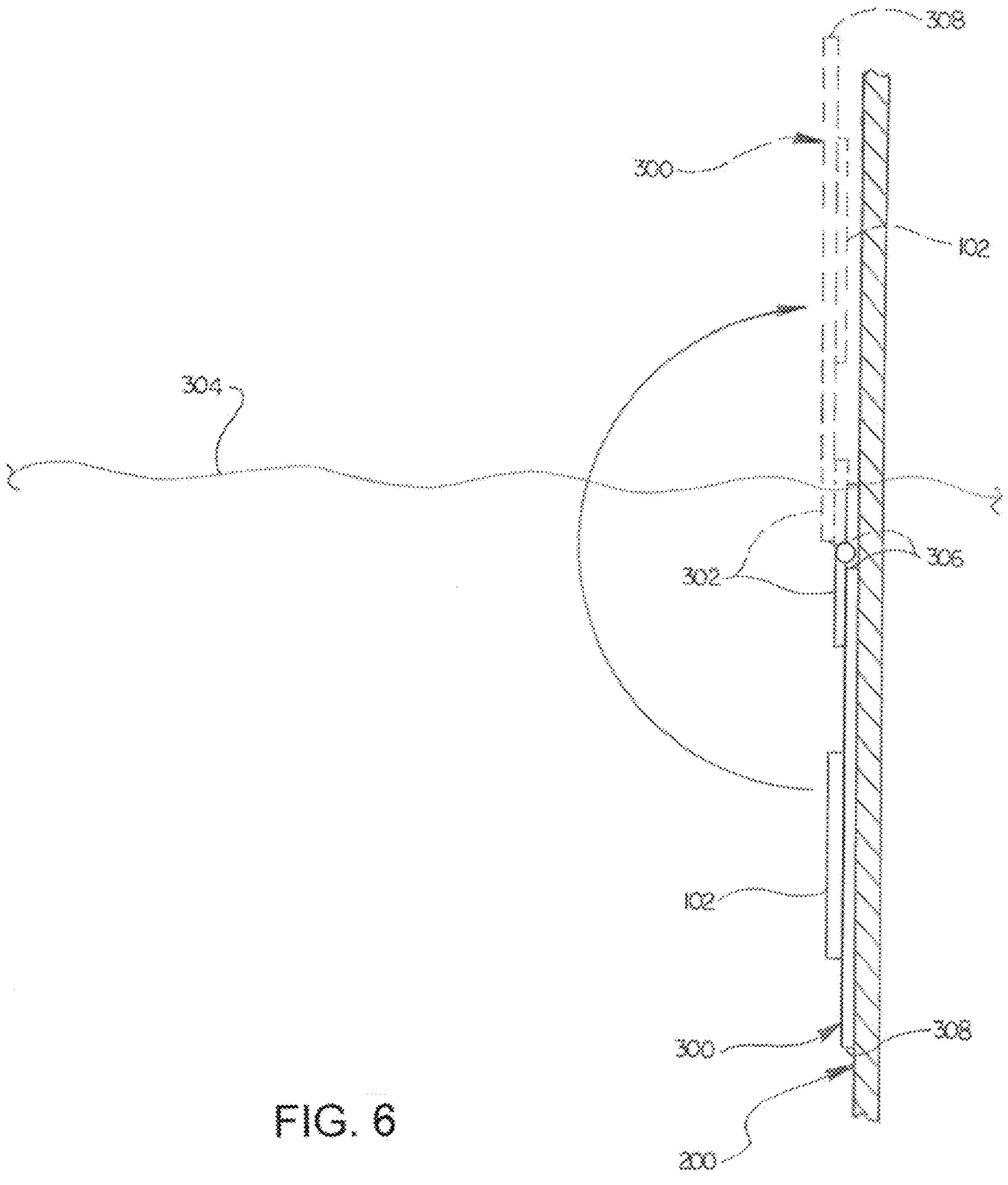
FIG. 6 illustrates a sectional view of the transom of a watercraft illustrating typical attachment of the speaker plate to the watercraft using one or more hinges.

According to several embodiments of the present invention, FIG. 1A illustrates a close up view of an exemplary underwater sound system 100 comprising multiple submersible underwater speakers 102 and underwater lights 103 fixedly and water tightly attached to transom area 204 of a watercraft 200 to provide omnidirectional sound transmission under the waterline. According to another exemplary embodiment as shown in FIG. 1B, the submersible underwater speakers 102 and the underwater lights 103 are attached to a speaker plate 300 that is configured to be hinged or hooked to the outer surface (204, 206) of watercraft 200, via one or more hinges 302, at a desired depth under the waterline allowing the speakers to detachably attached to the watercraft 200 to submerge in water when in use, as shown in solid lines, or may be lifted out of water, as shown in dashed lines, when not in use or for maintenance work. According to another exemplary embodiment as shown in FIG. 2, the speakers 102 and the underwater lights 103 are fixedly and water tightly attached throughout the outer surface area towards the lower portion of the hull area of the watercraft 200, such that the underwater speakers 102 and the lights 103 are submerged under the water surface while the watercraft 200 is in a water body. As further illustrated in FIG. 6, in some embodiments, the speaker plate 300 may have a proximal plate edge 306, a distal plate edge 308 and a flat or planar, outer plate surface 310. The speakers 102 and the underwater lights 103 may be mounted on the outer plate surface 310 between the proximal plate edge 306 and the distal plate edge 308. The hinge 302 may be attached to the speaker plate 300 at or near the proximal plate edge 306. In typical deployment of the watercraft 300 in the water body, the proximal plate edge 306 of the speaker plate 300 may be at or near the waterline 304. The distal plate edge 308 may be submerged beneath the water and the outer plate surface 310 may face away from the watercraft 200 in a first, lowered position of the speaker plate 300, shown in solid lines in FIG. 6, and lifted out of the water with the outer plate surface 310 facing toward the watercraft 200 in a second, raised position of the speaker plate 300, shown in dashed lines in FIG. 6. Accordingly, in the first position of the speaker plate 300, the speakers 102 and the underwater lights 103 may be submerged beneath the waterline 304. In the second position of the speaker plate 300, shown in dashed lines in FIG. 6, the speakers 102 and the underwater lights 103 may be disposed above the waterline 304 typically for repair, replacement, and/or maintenance thereof.

Figure 5:
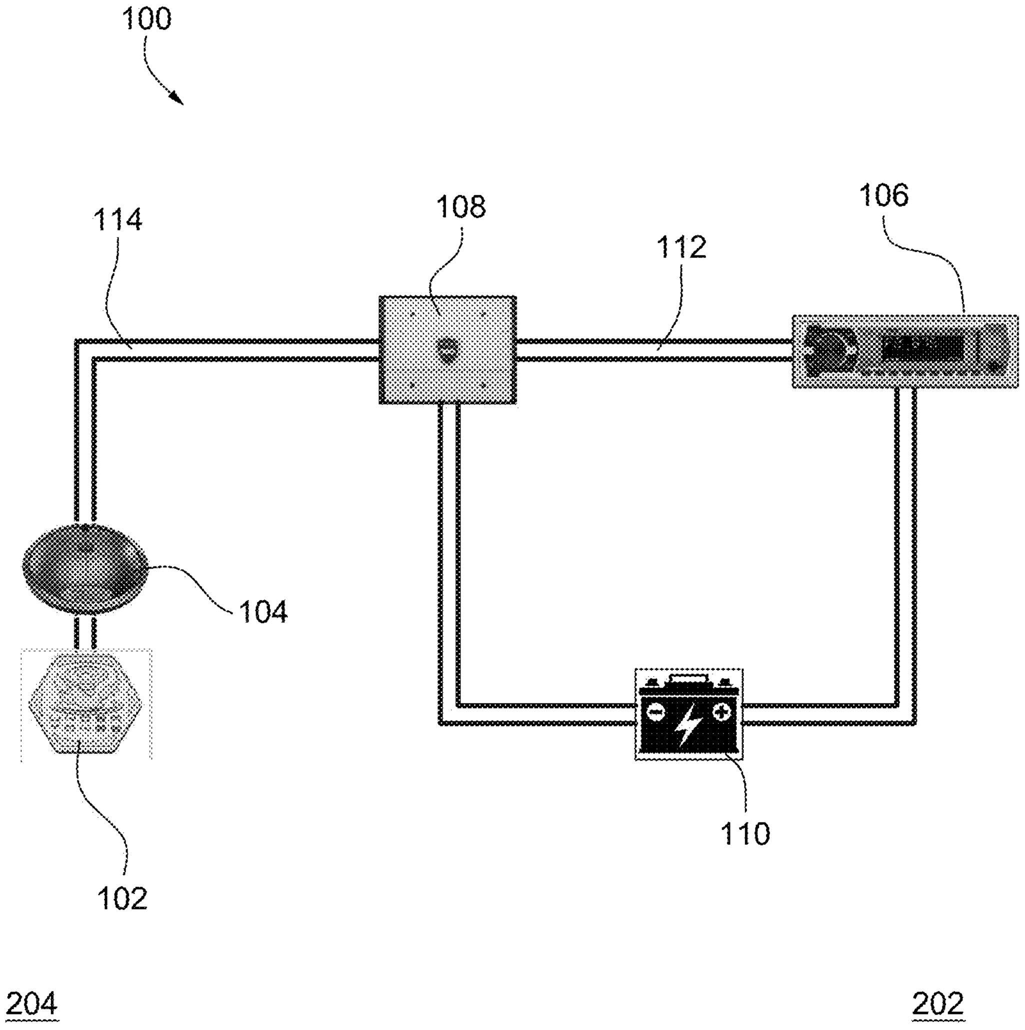
FIG. 5 illustrates a connection diagram of an exemplary underwater sound system, in accordance with an embodiment of the present invention

According to an aspect of the present invention as shown in FIG. 1A and FIG. 5, an underwater sound system 100 for a watercraft 200, wherein the sound system 100 comprises: a sound source 106; an amplifier 108 installed near the sound source 106 in a dry and ventilated area preferably at the bow end 202 of the watercraft 200, wherein the amplifier 108 and the audio source 106 are operatively connected using a two channel RCA cable 112; an all-weather transducer 104, wherein a 2-strand speaker wire 114 connects the amplifier 108 with the transducer 104 using one or more waterproof butt splices (not shown); one or more submersible waterproof underwater speakers 102 that use piezoelectric technology to create sound under the water line/surface, wherein the speakers 102 are fixedly and water tightly attached to transom area 204 of the watercraft to provide omnidirectional sound transmission under the waterline; and a power source 110 operatively connects and supply power to the sound system 100.

According to another aspect of the present invention, the sound source 106 is provided with a low line source output comprising an un-amplified sound signal.

According to another aspect of the present invention, the amplifier 108 is a class D two channel marine amplifier.

Figure 3:
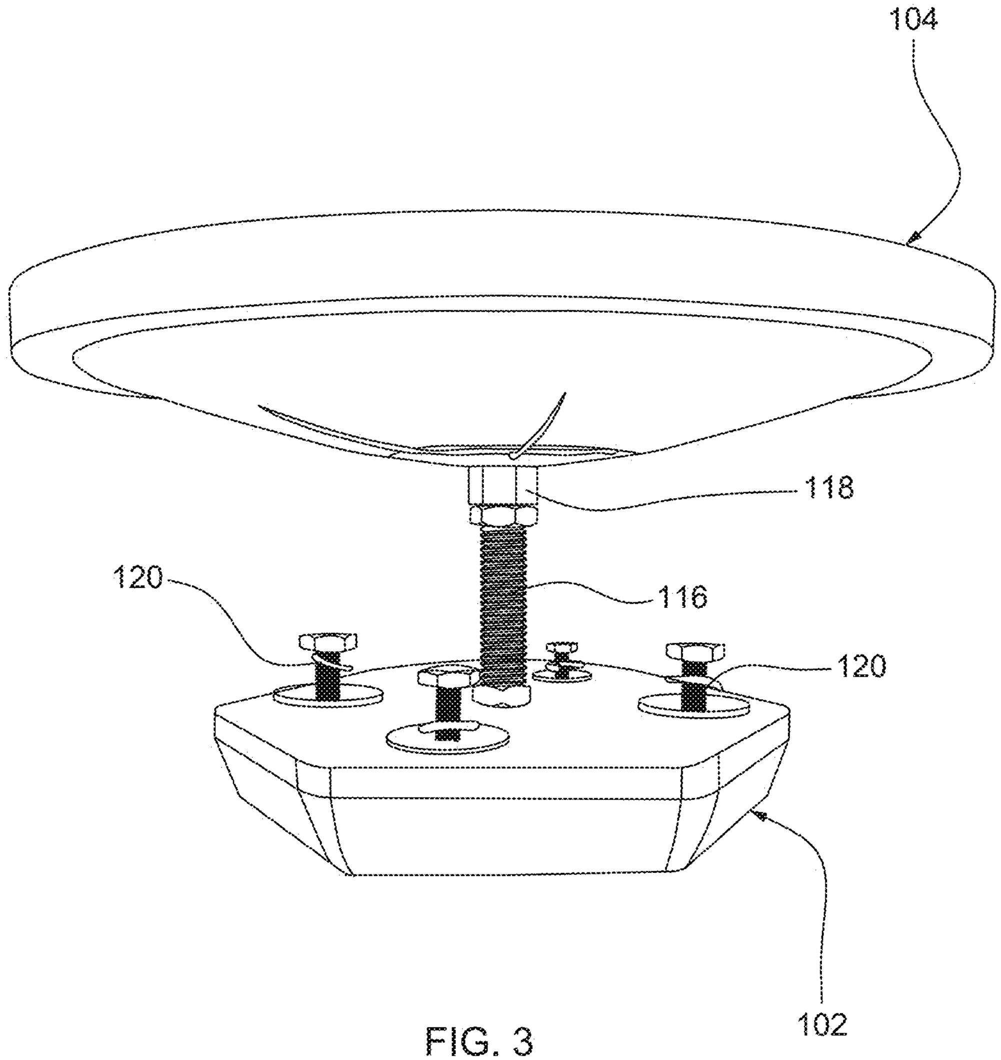
FIG. 3 illustrates an exploded view of attachment of an exemplary submersible underwater speaker to an all-weather transducer of the underwater sound system, in accordance with an embodiment of the present invention.

According to another aspect of the present invention as shown in FIG. 3, each of the waterproof speakers 102 comprises a central ⅜ stud 116 and one or more jam nuts 118 to provide waterproof attachment of the speaker 102 to the respective all-weather transducer 104.

According to another aspect of the present invention as shown in FIG. 2, each of the waterproof speakers 102 is fixedly attached to the outer surface (204, 206) of the watercraft 200 under the waterline by using a waterproof sealant between the matting surfaces of speaker 102 and the watercraft 200 and allowed to be cured.

According to another aspect of the present invention, the underwater sound system 100 is controlled by a remote-control unit (not shown).

According to another aspect of the present invention as shown in FIG. 1B and FIG. 5, an underwater sound system 100 for a watercraft 200, wherein the sound system 100 comprises: one or more submersible underwater speakers 102, wherein the speakers 102 are waterproof mounted to an underwater speaker plate 300 allowing the speakers 102 to submerge in water when in use and lifted out of water when not in use; one or more all-weather transducers 104 operatively connected to the respective one or more submersible underwater speakers 102; a sound source 106; an amplifier 108 operatively connected to the sound source 106; and a power source 110, wherein the sound source 106, the amplifier 108 and the power source 110 are positioned on the watercraft 200 and are operatively connected to the speakers 102 and the all-weather transducers 104 allowing the watercraft 200 to play sound under water surface.

According to another aspect of the present invention as shown in FIG. 1B, the speaker plate 300 is hinged to the to the watercraft 200 allowing the speakers 102 to submerge in water to play sound under water surface when the watercraft 200 is stationary.

According to another aspect of the present invention, the speaker plate 300 is hooked at desired depth inside water to the watercraft 200 allowing the speakers 102 to submerge in water to play sound under water surface when the watercraft 200 is stationary.

According to another aspect of the present invention, sound waves produced by the speakers 102 uses piezoelectric technology to create sound under the water line of the watercraft 200.

According to an exemplary embodiment as shown in FIG. 5, the submersible underwater speakers 102 are connected to a sound source 106 and a power source 110, wherein the sound source 106 and the power source 110 are placed inside the watercraft 200. The underwater sound system 100 comprising the plurality of submersible underwater speakers 102 makes the watercraft 200 function as a big speaker that plays music/audio under the water surface. The watercraft 200 mounted with the underwater sound system 100 of the present invention allows it to be used in a waterbody such as pond, lake, river, the ocean or the like so that some underwater activities can be conducted while the sound system 100 is being used to play music or voice of the user or any recorded sound that may be useful for attracting aquatic animals, or preventing any accidents, or supporting divers or any such activities without departing from the scope and spirit of the present invention.

According to another embodiment of the present invention, the sound waves produced by the speakers 102 of the present invention uses piezoelectric technology to create sound under the water line of the watercraft 200.

According to another embodiment of the present invention, the speaker plate 104 may additionally contain underwater lights 103.

According to another embodiment of the present invention, as shown in FIG. 5, the system 100 comprises an audio/sound source 106 with an open low line output, a two channel RCA Cable 112 of at least 5 feet long or as per the distance between the bow area 202 to transom area 204 of the watercraft 200, a two channel marine amplifier 108, a 2-strand speaker wire 114 of desired length determined by amplifier 108 location and length of the watercraft 200, an all-weather transducer 104 that are designed to withstand the challenging environmental conditions, a marine under toned speaker 102, marine sealant (not shown) and some waterproof butt splices (not shown) to connect wires and a power source 110 such as power source of the watercraft 200 or a battery or a solar cell or the like is operatively connected to the system 100 of the present invention.

According to another exemplary embodiment of the present invention, as shown in FIG. 3, the waterproof speaker 102 has a plurality of attachment pins/screws (116, 118, 120) that facilitate attachment of the waterproof speaker 102 with the outer surface of the watercraft 200 at the transom area 204 near the swim deck or around the hull area 206 that is submerged below the waterline, wherein a central stud or a screw 116 is used to attach the waterproof speaker 102 to the all-weather transducer 104, in an example without limitation the all-weather transducer 104 is attached to the waterproof speaker 102 using a ⅜ stud 116 and jam nuts 118. The connection of the waterproof speaker 102 to the all-weather transducer 104 and the mounting of the waterproof speaker 102 to the mounting surface of the watercraft 200 is made waterproof by using a waterproof sealant between the matting surfaces and allowed to be cured without limitation sika flex or 3M-5200 or the like. Each waterproof speaker 102 may have an inner speaker surface 122 which faces toward the watercraft 200 and an outer speaker surface 124 which faces away from the watercraft 200. The all-weather transducer 104 may have an outer transducer surface 126 which faces the inner speaker surface 122 of the waterproof speaker 102 and an inner transducer surface 128 which is opposite the outer transducer surface 126. The stud 116 may span between the inner speaker surface 122 of the waterproof speaker 102 and the outer transducer surface 126 of the all-weather transducer 104. The attachment pins/screws 120 may protrude from the inner speaker surface 122 of the waterproof speaker 102 toward the outer transducer surface 126 of the all-weather transducer 104.

Figure 4:
FIG. 4 illustrates an exemplary submersible underwater speaker of the underwater sound system, in accordance with an embodiment of the present invention.

According to another embodiment of the present invention as shown in FIGS. 3-5, the amplifier is installed in a dry and ventilated location near the audio source 106. The 2-strand speaker wire 114 connects the amplifier 108 to the transducer 104 using waterproof butt splices (not shown), however any known mechanism to provide a waterproof connection between the amplifier 108 and the transducer 104 can be achieved without departing from the scope and spirit of the present invention. Further without limitation, the audio source 106 is connected to the amplifier 108 using the available RCA cables 112 to provide a quick detachable attachment of the amplifier 108 to the audio source 106. The audio quality, power, mode of operation of the amplifier 108 is based on specification and quality of the audio source 106 and the amplifier 108, further a remote-control device (not shown) can be used to actuate and control the system 100 of the present invention. The audio volume of the speaker 102 is adjusted by proper tuning of the amplifier 108 so that the watercraft 200 to functions as a big speaker that plays music/sound under the waterline.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An underwater sound system for on a watercraft having a transom area, wherein the sound system comprises:

at least one outer surface of the watercraft;

a sound source;

an amplifier installed in a dry and ventilated area near the sound source, wherein the amplifier and the audio source are operatively connected using a two channel RCA cable;

an all-weather transducer having an outer transducer surface and an inner transducer surface opposite the outer transducer surface, wherein a 2-strand speaker wire connects the amplifier with the transducer using one or more waterproof butt splices;

one or more submersible waterproof underwater speakers that use piezoelectric technology to create sound under the water line, each of the speakers having an inner speaker surface facing the outer transducer surface of the all-weather transducer and an outer speaker surface opposite the inner speaker surface, wherein the inner speaker surface is fixedly and water tightly attached to the outer surface at the transom area of the watercraft to provide omnidirectional sound transmission under the waterline;

a plurality of attachment pins/screws configured to facilitate attachment of the waterproof speaker with an outer surface of the watercraft, the attachment pins/screws protruding from the inner speaker surface toward the outer transducer surface;

a central stud or a screw configured to attach the waterproof speaker to the all-weather transducer, the stud or screw spanning between the inner speaker surface and the outer transducer surface; and a power source operatively connects and supply power to the sound system.

2. The underwater sound system as claimed in claim 1, wherein the sound source is provided with a low line source output comprising an un-amplified sound signal.

3. The underwater sound system as claimed in claim 1, wherein the amplifier is a class D two channel marine amplifier.

4. The underwater sound system as claimed in claim 1, wherein each of the waterproof speakers comprises one or more jam nut to provide waterproof attachment of the speaker to the respective all-weather transducer.

5. The underwater sound system as claimed in claim 1, wherein each of the waterproof speaker is fixedly attached to the outer surface of the watercraft under the waterline by using a waterproof sealant between the matting surfaces of speaker and the watercraft and allowed to be cured.

6. The underwater sound system as claimed in claim 1, wherein the underwater sound system is controlled by a remote-control unit.

7. An underwater sound system for watercraft, wherein the sound system comprises:

one or more submersible underwater speakers, wherein the speakers are waterproof mounted to an underwater speaker plate and at least one hinge configured to pivotally attach the underwater speaker plate to the watercraft allowing the speakers to submerge in water when in use in a first position of the underwater speaker plate and lifted out of water when not in use in a second position of the underwater speaker plate;

wherein the underwater speaker plate has a proximal plate edge at the at least one hinge, a distal plate edge opposite the proximal plate edge and a flat or planar, outer plate surface, the distal plate edge submerged beneath the water and the outer plate surface configured to face away from the watercraft in the first position and lifted out of the water and the outer plate surface configured to face toward the watercraft in the second position, and the speakers are on the outer plate surface between the proximal plate edge and the distal plate edge;

one or more all-weather transducers operatively connected to the respective one or more submersible underwater speakers;

a sound source;

an amplifier operatively connected to the sound source; and a power source, wherein the sound source, the amplifier and the power source are positioned on the watercraft and are operatively connected to the speakers and the all-weather transducers allowing the watercraft to play sound under water surface.

8. The underwater sound system as claimed in claim 7, wherein the speaker plate is hinged to the transom of the watercraft allowing the speakers to submerge in water to play sound under water surface when the watercraft is stationary.

9. The underwater sound system as claimed in claim 7, wherein the speaker plate is hooked at desired depth inside water to the watercraft allowing the speakers to submerge in water to play sound under water surface when the watercraft is stationary.

10. The underwater sound system as claimed in claim 7, wherein sound waves produced by the speakers uses piezoelectric technology to create sound under the water line of the watercraft.

* * * * *